United States Patent [19]
Matsumoto et al.

[11] Patent Number: 5,898,683
[45] Date of Patent: Apr. 27, 1999

[54] BASE STATION SYSTEM SUITABLE FOR MICROCELLS

[75] Inventors: Shinji Matsumoto, Tokyo, Japan; Nagayasu Harada, Lake Mary, Fla.; Hiroshi Matsuyama, Tokyo, Japan; Robin U. Roberts, Orlando; Michael H. Speanburg, Deltona, both of Fla.

[73] Assignees: Mitsubishi Denki Kabushiki Kaisha, Tokyo, Japan; Mitsubishi Wireless Communications, Inc., Duluth, Ga.

[21] Appl. No.: 08/724,912

[22] Filed: Oct. 2, 1996

[30] Foreign Application Priority Data

Oct. 3, 1995 [JP] Japan ................................. 7-256545

[51] Int. Cl.$^6$ ........................................................ H04Q 7/24
[52] U.S. Cl. ........................... 370/338; 370/328; 370/338; 370/401; 455/422; 455/426; 455/560
[58] Field of Search .................................. 370/328, 338, 370/401; 455/462, 463, 464, 422, 426, 560, 520

[56] References Cited

U.S. PATENT DOCUMENTS

| | | | |
|---|---|---|---|
| 4,777,633 | 10/1988 | Fletcher et al. | 370/50 |
| 5,276,905 | 1/1994 | Hurst et al. | 455/33.1 |
| 5,305,467 | 4/1994 | Herndon et al. | 370/338 |
| 5,321,737 | 6/1994 | Patsiokas | 379/58 |
| 5,327,574 | 7/1994 | Monma et al. | 455/33.2 |
| 5,425,031 | 6/1995 | Otsuka | 455/560 |
| 5,471,649 | 11/1995 | Rees et al. | 455/67.4 |

*Primary Examiner*—Chi H. Pham
*Assistant Examiner*—Frank Duong
*Attorney, Agent, or Firm*—Rothwell, Figg, Ernst & Kurz

[57] ABSTRACT

A base station is configured including an internal bus to connect a terminal section, transceivers that perform control and management of information to be transmitted or received and carries out radio communication at a predetermined radio frequency and on a predetermined communication method, and a controller connecting section that executes communication with a base station controller. The transceivers each comprise a transmitter/receiver section that transmits and receives radio waves at a predetermined radio frequency and using a predetermined communication method, and a logical control unit that performs control of the transmitter/receiver section and interference detection. The base station further comprises a high-frequency section that carries out radio communication with mobile stations, and a base station main control unit that collectively controls processing to be conducted in the base station, thereby collectively executing the processing involved in a radio communication with the mobile stations. The base station controller on the other hand collectively performs line communication processing. By distributing necessary functions in this manner, the number of times communication between the base station and the base station controller is carried out is minimized. Thus, a base station system suitable for microcells is provided.

15 Claims, 9 Drawing Sheets

BASE STATION SYSTEM SUITABLE FOR MICROCELLS

BACKGROUND OF THE INVENTION

1. Field of the Invention

The present invention relates generally to a base station system carrying out a radio communication with automobile telephones, portable telephones, etc., in a mobile communication system, and more particularly to the form of a base station constituting the base station system and covering a cell having a small radius, a so-called microcell, and suitable for the microcell.

2. Description of the Related Arts

In a mobile communication system utilizing mobile vehicle-carrying communication apparatuses or mobile portable communication apparatuses (hereinafter referred to generally as mobile stations) typically called automobile telephones or portable telephones, a plurality of radio base stations are placed in a service area allowing communications to provide communication service. Each radio base station (hereinafter referred to simply as a base station) carries out radio communication with mobile stations lying within a cell which that base station covers. Various inventions have been hitherto filed which pertain to the system structure and communication apparatuses such as base station or mobile station. The following are examples of such applications.

1. U.S. Pat. No. 4,777,633 entitled BASE STATION FOR WIRELESS DIGITAL TELEPHONE SYSTEM filed on Aug. 14, 1987.

2. U.S. Pat. No. 5,276,905 entitled MOBILE RADIO TRANSMISSION SYSTEM USING PREFERRED HOME SERVICE AREA filed on Feb. 7, 1990.

3. U.S. Pat. No. 5,321,737 entitled CORDLESS TELEPHONE COMMUNICATION SYSTEM HAVING BASE STATIONS WITH MEMORY FOR QUICK ACCESS TO INFORMATION filed on May 12, 1993.

Figure 9:
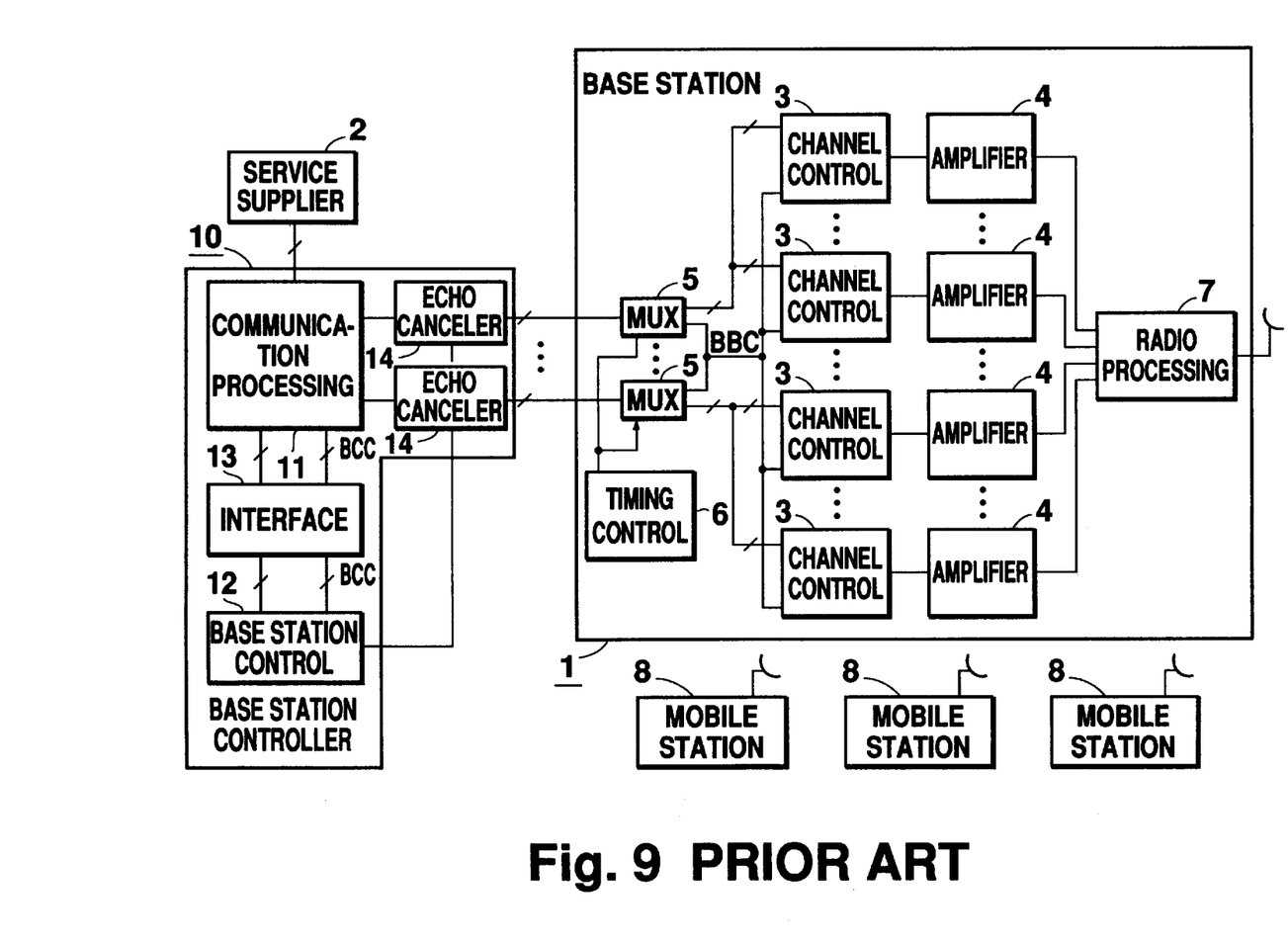
FIG. 9 is a schematic view showing a configuration of a conventional base station system.

Referring now to FIG. 9 of the drawings there is illustrated a schematic configuration of a base station system disclosed in the U.S. Pat. No. 4,777,633. The conventional base station system comprises a plurality of base stations 1 each carrying out radio communication with mobile stations 8, and a base station controller 10 connected to a service supplier 2 and serving to control the plurality of base stations 1.

The base station 1 includes a plurality of transceivers provided for each channel, and consisting of a combination of a channel control section 3 and an amplifier 4, a plurality of multiplexers (MUX) 5 distributing information from the base station controller 10 to the transmitter receivers, a timing control section 6 executing timing control of the multiplexers 5, and a radio processing section 7 carrying out radio communications between the transmitter receivers and the mobile stations 8.

The base station controller 10 includes a communication processing section 11 carrying out line communication with the service supplier 2 and carrying out communication with the base stations, a base station control section 12 serving to control base station to base station communication, an interface 13 disposed between the communication processing section 11 and the base station control section 12, and a plurality of echo cancelers 14 corresponding to the MUXs 5 of the base station 1.

The base station 1 in the conventional base station system having the above configuration distributes multiplexed data sent out from the base station controller 10 to the transmitter receivers by use of the MUXs 5. Each transmitter receiver places data into a time slot and carries out radio communication with a predetermined mobile station 8 using a TDMA method. The transmitter receivers are each able to perform simultaneous communication with a plurality of mobile stations 8. On the contrary, information from the mobile stations 8 received by the base station 1 is sent intact to the base station controller 10 for predetermined processing. The base station controller 10 in the conventional base station system performs not only line communication processing associated with the service supplier 2 but also collective management of communication control associated with the base station 1. This means that the base station controller 10 takes charge of control of radio processing between the mobile stations 8 and the base stations 1.

In this manner the conventional base station system causes the base station controller 10 to execute both line communication processing and processing involved in radio communications with the mobile stations 8. This will result in a configuration of a so-called base station controller leading type in which the base station controller predominates over the base stations. For this reason, the scale of the base station controller 10 configuration is enlarged, resulting in a form of system suited to a wider range of cell, a so-called macrocell, for an automobile telephone system and the like. Due to its large-scale configuration, the base station controller 10 is ordinarily constituted of custom-made items.

In order to ensure application over a wider range such as the automobile telephone system, the conventional mobile communication systems elongated the radius of a cell that one base station covers. In recent years, however, it has become desired to reduce the cell radius into a smaller cell, that is, a microcell, and to save the power consumed by transmission and reception, so as to ensure service by the mobile communication system within a restricted range such as underbuilding shopping centers and not to interfere with the action of the other radio apparatuses. A smaller cell will contribute to power saving of each base station, and hence to downsizing of the apparatus.

However, the conventional base station system has a configuration suitable for the macrocell, so that even if it is successfully applied to the microcell by reducing the specifications of the large-scale system, the line service charge will increase since the base station system collectively controls the base stations resulting in frequent communications between the base stations and the base station controller. Because of the fact that the number of base stations increases accordingly as the cell radius is reduced, this will impractically lead to an even greater line service charge.

SUMMARY OF THE INVENTION

The present invention was conceived to overcome the above problems. It is therefore an object of the present invention to provide a base station system suitable for microcells. Another object is to provide a base station system applicable to the microcells by making use of a base station configuration in the base station system suitable for the microcells.

In order to accomplish the above objects, a base station system in accordance with the present invention comprises at least one base station having a radio communication processing function for carrying out a radio communication with mobile stations, and a base station controller for controlling the base station, the base station controller having a line communication processing function for performing a network communication. That is, in mobile communications the present invention has concentrated processing functions involved in radio communications with mobile stations into the base station, and concentrated processing functions associated with network communications, such as for example public network, into the base station controller, thereby minimizing the number of times of communication between the base stations and the base station controller. Thus according to the present invention, line service charges imposed on communications between the base stations and the base station controller can be reduced to a minimum, making it possible to provide a base station system suitable for microcells requiring a greater number of base stations.

The base station described above includes at least one transceiver that performs control and management of information to be transmitted or received, high-frequency distribution and combining means that allow information radio communication between the transceiver and the mobile stations, communication means that performs communication with the base station controller, an internal bus that connects the transceiver and the communication means, and general control means that performs general control of radio communication processing.

The base station system further comprises a bus coupling means for coupling the internal bus of the base station and the internal bus of other base stations, to form a base station group. This will lead to an increase in the number of the transceivers in the base stations constituting one group, which in turn results in an increased number of communication channels in the base stations.

Preferably the base station performs communication with the base station controller by way of other base stations. The base station further includes switching means operable to switch paths for communication with the base station controller. Preferably the general control means serves to perform a switching control of whether communication with the base station controller is to be performed by use of the communication means mounted thereon or by way of another base station. The base station group includes high-frequency coupling means for coupling the high-frequency distribution and combining means possessed by the base stations.

The base station system further comprises combining output means for combining and outputting transmission information from the plurality of base stations, and information distribution means for distributing information from the mobile stations among the base stations, whereby an integral base station is formed in which the plurality of base stations are mounted in the form of radio communication processing means. In other words, this invention is so configured that a single base station does not actually possess the base station functions but merely provides some of the radio communication functions which the base station requires.

That is, a combination of base stations results in a single functioning base station. This configuration would enable the present invention to be applied to a microcell in which a single base station covers a wider range.

The combined base station includes information distribution means serving to distribute information received from the mobile stations to other the integral base station connected thereto. The combined base station also includes base station coupling means serving to couple the base stations with one another.

The base station uses a plurality of communication methods at the same time. Preferably the base station allows an arbitrary setting of radio frequency used by the transceiver, thereby performing simultaneous communication with the mobile stations by use of different radio frequencies. The base station further includes testing device connection means that connects testing mobile stations for verifying actions.

DESCRIPTION OF THE PREFERRED EMBODIMENTS

Preferred embodiments of the present invention will now be described with reference to the accompanying drawings wherein like reference numerals represent like parts throughout the several views.

Embodiment 1

Figure 1:
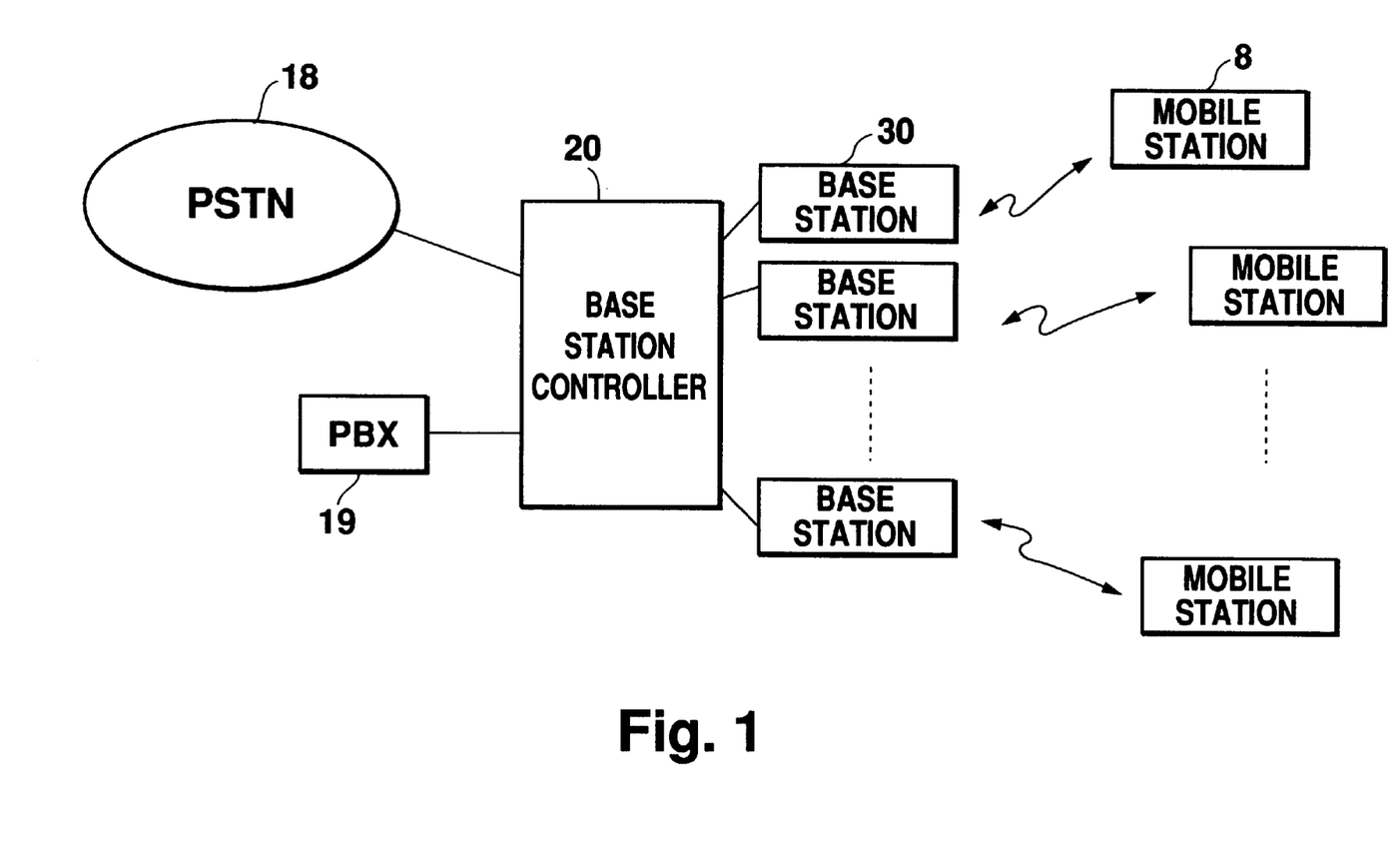
FIG. 1 is a schematic block diagram showing a first embodiment of a base station system in accordance with the present invention.

Referring first to FIG. 1 there is depicted in a schematic block diagram a first embodiment of a base station system in accordance with the present invention. The base station system in this embodiment comprises a plurality of base stations 30 carrying out radio communication with corresponding mobile stations 8, and a base station controller 20 operable to allow a line connection between PSTN (Public Switched Telephone Network) 18 and PBX (Private Branch Exchange) 19 and a connection to the plurality of base stations 30.

Figure 2:
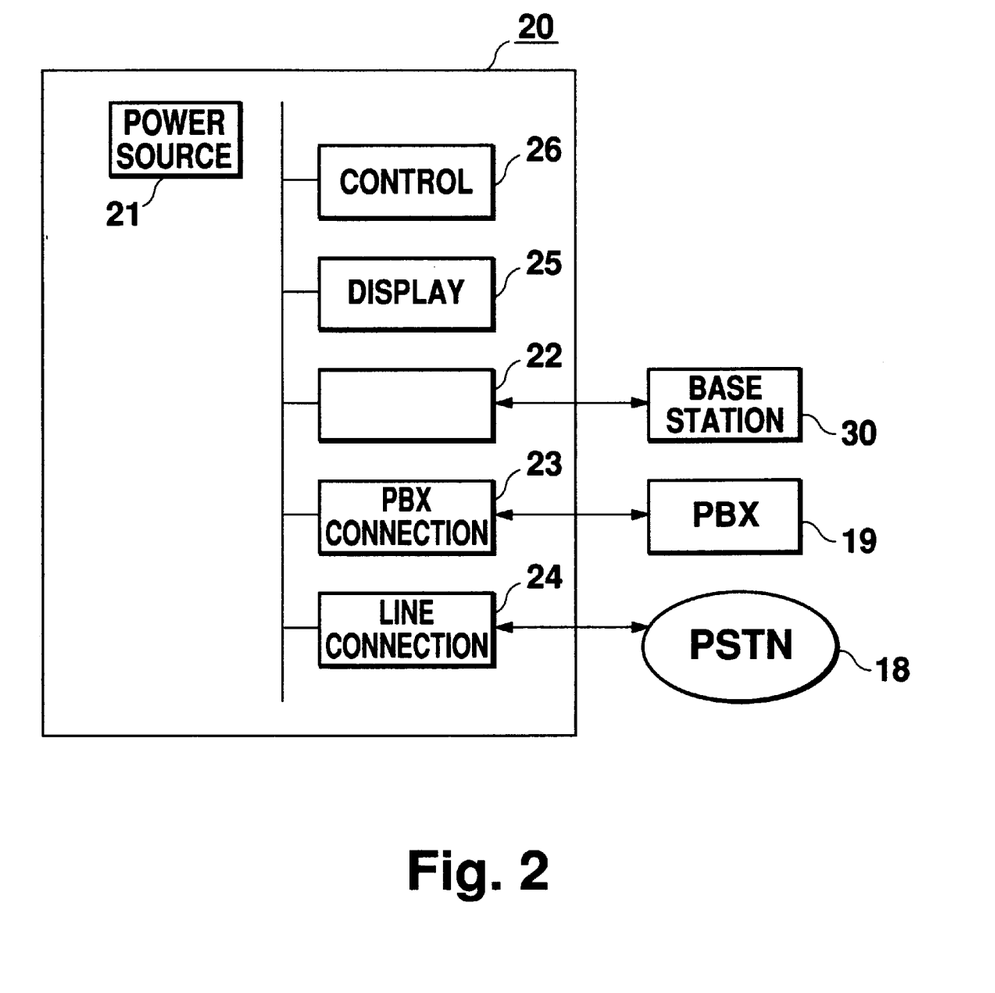
FIG. 2 is a block diagram of a base station controller in the first embodiment.
Figure 3:
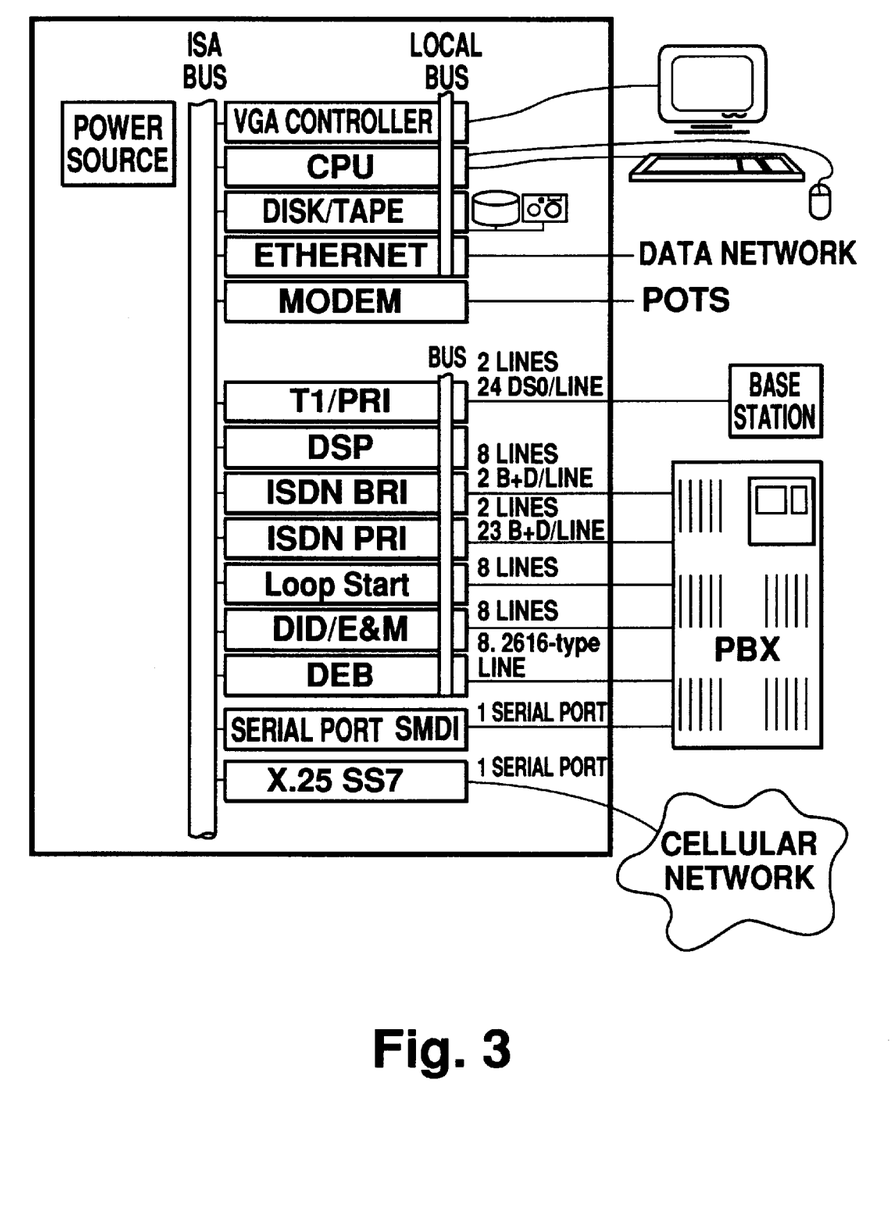
FIG. 3 is a representation showing a specific example of configuration of the base station controller in the first embodiment.

Referring then to FIG. 2 there is depicted a block diagram of the base station controller 20 employed in the first embodiment. The base station controller 20 comprises a power source 21, a base station connecting section 22 that allows a connection through a T1 digital line with each of the base stations 30, a PBX connecting section 23 that allows a connection with the PBX 19, a line connecting section 24 in the form of an X. 25 interface that allows a connection through an SS7 protocol with the PSTN 18, a display section 25 for displaying a variety of information such as various set values and communication information required in the base station system, and a control section 26 for controlling the above-described sections. The base station controller 20 in this embodiment is implemented by a general personal computer. It is therefore to be appreciated that the display section 25 and the control section 26 correspond to a CRT and a CPU, respectively. It is natural, although not shown, that the controller 20 also be provided with an input device including a keyboard and an external storage device such as a magnetic disk. The connecting sections 22, 23, 24 can be implemented by existing interfaces. A more specific configuration of the base station controller 20 is illustrated by way of example in FIG. 3.

Figure 4:
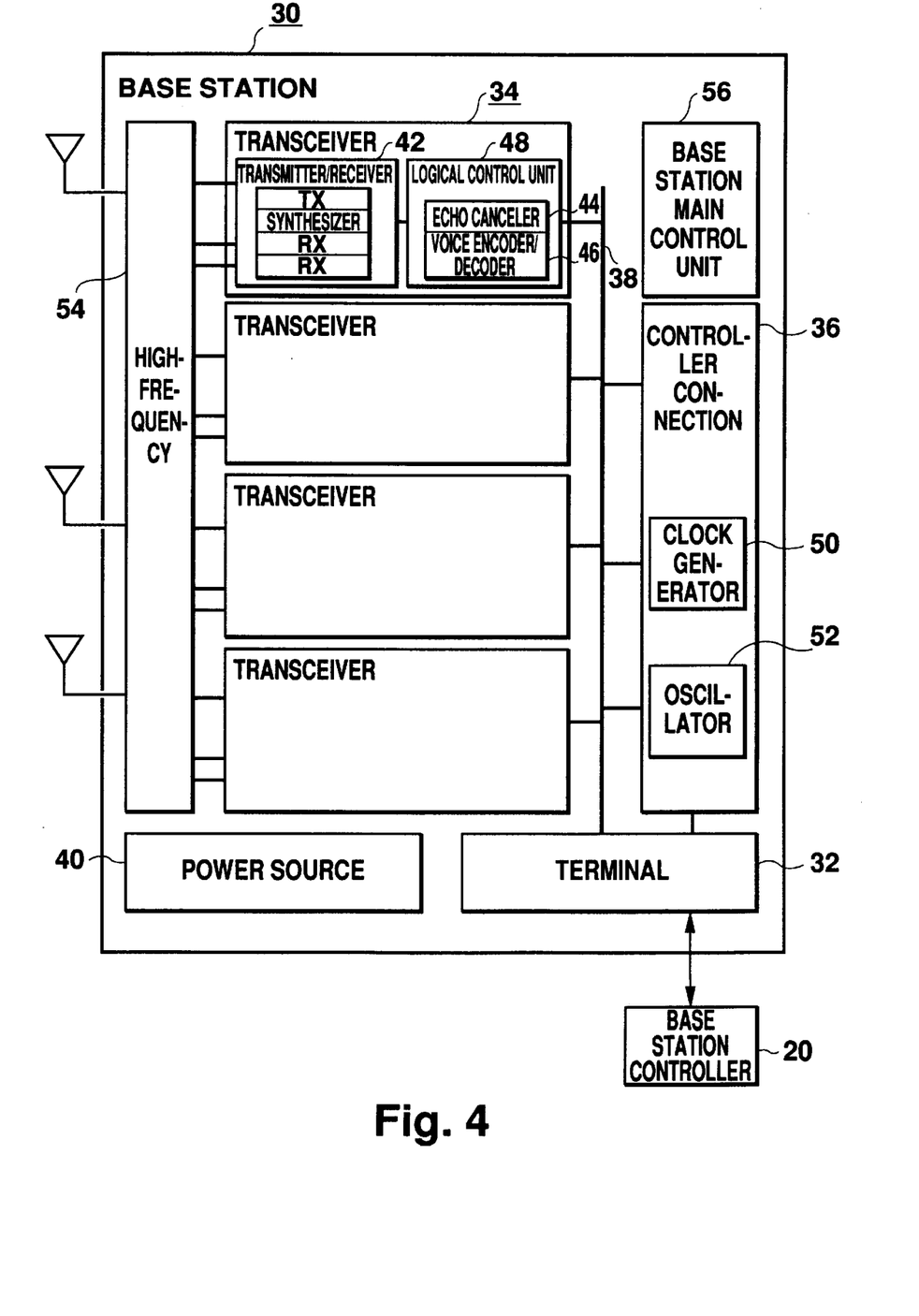
FIG. 4 is a block diagram of a base station in the first embodiment.

Referring now to FIG. 4 there is depicted a block diagram of the base station 30 employed in the first embodiment. The base station 30 comprises a terminal section 32, transceivers 34, and a controller connecting section 36, these being connected by an internal bus 38 with one another. The terminal section 32 has a physical connector. The transceivers each 34 perform a control and management of information to be transmitted or received. Although in FIG. 4 the base station 30 is shown equipped with four transceivers 34, at least one transceiver will suffice. Alternatively, more than four transceivers may be provided. More specifically four slots are provided for the transceivers 34 so as to allow arbitrary addition or replacement of the transceiver units. Also the arrangement in which the transceivers 34 are connected to the internal bus 38 will facilitate such work for the addition or replacement. In the case of a configuration in which all of the four transceivers 34 employ as a communication method a time division multiple access (TDMA) method including three transmission time slots per frame, a single base station 30 will allow twelve (12) communication channels to be simultaneously provided. The transceiver 34 in this embodiment comprises a transmitter/receiver section 42 intended to distribute and combine data for the transmission and reception at a predetermined radio frequency and using a predetermined communication method, and a logical control unit 48, including an echo canceler 44 and a voice coder/decoder 46, for controlling TDMA signal frame formation and controlling the transmitter/receiver section 42 in response to a connection demand from a mobile station. The logical control unit 48 has an interference detection ability which enables channels subjected to any interference to be automatically detected during the reception of radio waves from the mobile station 8, and a list indicating available channels is created. The details of the communication method and of the radio frequency to be used will be described later. The controller connecting section 36 is communication means for carrying out communication with the base station controller 20 and includes a clock generator 50 and an oscillator 52. Since this embodiment employs a T1 standard digital line, it is natural that the controller connecting section 36 be an interface in conformity with the T1 standard. The base station 30 further comprises a power source section 40, a high-frequency section 54 connected to all the transceivers 34 and acting as high-frequency distributing and combining means for carrying out radio communication with the mobile station 8, and a base station main control unit 56 acting as integrative control means for performing integrative control of various processing such as radio communication processing to be performed in the base station 30. The base station 30 having the above configuration has such dimensions that it can be hung on the wall. It should be noted that a cell radius in this embodiment is assumed to be in the order of 100 meters or less.

Typical base station systems have, as functions indispensable for mobile communications, a radio communication processing function for carrying out a radio communication with the mobile stations 8, and a line communication processing function for executing a network communication with the PSTN 18 or the like. As shown in the above configuration the base station system in this embodiment is characterized in that the elements necessary for the radio communication with the mobile stations 8 are concentrated into the base station 30. In other words, the radio communication processing function is designed to be exclusively implemented by the base station 30, not by the base station controller 20. On the contrary, the line communication processing function is designed to be exclusively implemented by the base station controller 20, not by the base station 30. This is due to the fact that the provision of the base station main control unit 56 enables the base station 30 to implement the radio communication processing function by itself without being controlled by the base station controller 20. Such distribution of the functions will minimize the amount of information to be transmitted or received between the base station 30 and the base station controller 20. Accordingly even though the number of the base stations 30 increases with a recent tendency toward a reduction in the cell radius, the number of times the line between the base station 30 and the base station controller 20 is utilized can be minimized, resulting in prevention of a rise in charge due to frequent line service.

This will also ensure a reduction in dimensions and functions of the base station controller 20 since there is no need to perform the radio communication processing which has been hitherto required. Thus the base station controller 20 can be realized by a general purpose computer as stated hereinabove. It is to be noted that the mobile station can be a conventional one.

Description will be given of an action of the first embodiment.

A procedure for a channel connection will be first explained. When a mobile station 8 issues a call setting demand, a base station 30 covering a cell in which that mobile station 8 is located notifies a base station controller 20 to that effect. On the basis of control information including the call setting demand, the base station controller 20 retrieves subscribers' information and the like associated with the mobile station 8 and then allows a connection to a telephone line. In the case of the U.S. automobile telephone system, for instance, the base station controller 20 accesses IS-41 (a database containing positional information on automobile telephone and subscribers' information) via a PSTN to receive information associated with the mobile station 8 and executes the channel connection. Once a channel connection is established, any communication associated with the radio communication conducted between the mobile station 8 and the base station 30 will no longer be made between the base station 30 and the base station controller 20 unless the mobile station 8 moves out of the cell in which it is currently located. When the mobile station 8 moves out of the cell in which it is currently located, the base station 30 covering the cell which has included the mobile station 8 so far will notify the base station controller 20 to that effect. The base station controller 20 performs a control to switch the base stations 30. In the case where the base station system has received a line disconnection demand, the base station controller 20 will carry out predetermined processing to disconnect the telephone line.

It is to be appreciated for this embodiment that the processing such as line connection and disconnection to be performed in the base station system is the same as in the conventional system, and that the actions of respective devices are also substantially the same as those of the conventional system. The feature of this embodiment lies in that unless the mobile station 8 moves out of the cell in which it is currently located, any communication associated with the radio communication conducted between the mobile station 8 and the base station 30 is not made between the base station 30 and the base station controller 20. This means that in this embodiment the processing to be performed by the base station 30 can be done within that base station 30 in a closed manner. Irrespective of increased number of cells attendant on the reduction in cell size, this will minimize a rise in line service charge which may be caused by frequent communications between the base station 30 and the base station controller 20. Also the base station 30 is provided with the elements necessary for the processing to be performed in the base station 30, thereby enabling the base station controller 20 to be constituted by a commercially available computer without needing any specific configuration.

Although the base station system of this embodiment has been applied to a public network for illustrative purposes only, it is naturally applicable to a private system for enterprises and the like only a single base station controller 20 is illustrated in FIG. 1 but instead a plurality of base station controllers 20 may be provided each connecting to a PSTN or the like.

Embodiment 2

The above-described first embodiment employed a system configuration in which one base station carrying thereon four transceivers is installed within a service area. As stated hereinabove, the number of transceivers to be mounted is not specifically limited in the above embodiment. However one of the features of the base station in the first embodiment lies in that it is of a sufficiently small size to be hung on the wall, and hence it is not preferable to increase the number of transceivers to be mounted unduly.

A feature of second embodiment of the present invention is therefore to increase the number of transceivers to be installed within each cell by interconnecting the base stations. Therefore, although a plurality of base stations are linked together, they will constitute substantially a single base station. It may also be envisaged that the plurality of base stations thus linked together form a single cell.

Figure 5:
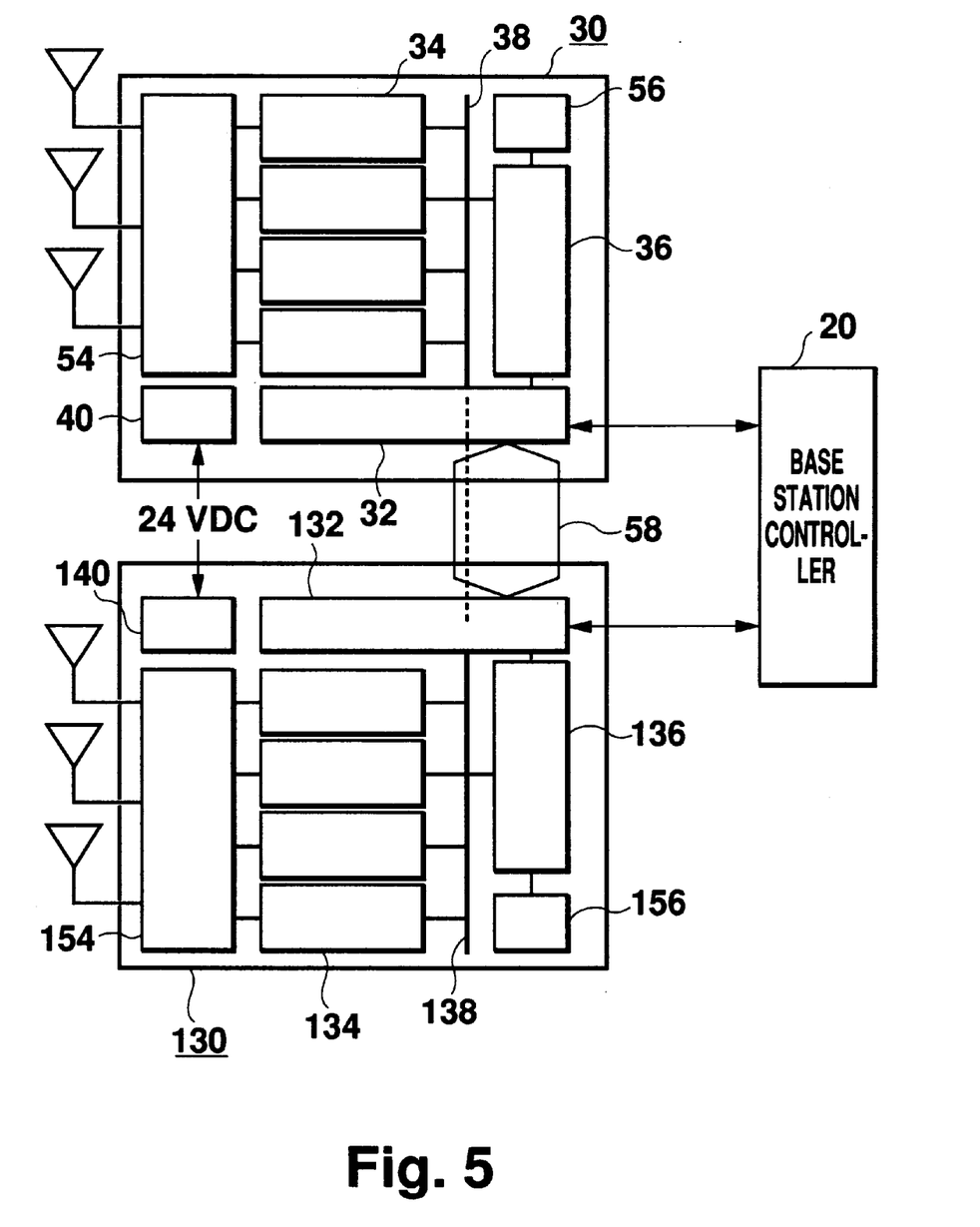
FIG. 5 is a block diagram of a base station group in a second embodiment of a base station system in accordance with the present invention.

Referring now to FIG. 5 there is depicted a configuration of two base stations coupled together in the second embodiment. One base station 30 is designated by the same reference numeral since it has the same configuration as in FIG. 4. The other base station 130 coupled with the base station 30 also has a similar configuration but is prefixed with 100. This embodiment is characterized by the provision of a connection cable 58 serving as bus connection means for coupling internal buses 38 and 138 together to thereby interconnect the two base stations 30 and 130. In FIG. 5 the terminal sections 32 and 132 having physical connectors are coupled with each other, whereby a plurality of base stations can form a base station group allowing more transceivers to be mounted and hence more communication channels to be set.

This configuration would enable the base station 130 to communicate with the base station controller 20 by way of two different paths.

Firstly available is a path making use of its own controller connecting section 136 by means of which information is directly transmitted to or received from the base station controller 20. Secondly available is a path utilizing the connection cable 58 through which the controller connecting section 36 disposed within the other base station 30 transmits and receives information to and from the base station controller 20. In the case of the second path, the controller connecting section 136 is substituted by the controller connecting section 36 in the base station 30 for the execution of a data communication with the base station controller 20, with the base station 30 delivering data via the internal bus 38 and connection cable 58 to the base station 130. The base station main control unit 156 controls switching of which path to select. At that time, it is necessary for the base station main control unit 156 to issue a command for control of the controller connecting section 36 to the base station main control unit 56 of the base station 30. Also the base station 130 must be provided with switch means for switching the data transmission paths. The connection of the base station 130 with only one base station 30 would necessitate a change-over switch between the base station 30 and the controller connecting section 136.

Such a provision of two different paths would ensure, even if any abnormality occurs on either path, communication with the base station controller 20 by way of the other path. Although the above description has been given of the case where the base station 130 has two paths, if the two base stations are on equal terms with each other, the base station 30 will also undergo the same action.

Turning to a configuration illustrated in FIG. 5, if the base station 130 only uses the second path, namely the pass via the base station 30, the production cost for the base station 130 will be curtailed since the base station 130 can exclude the controller connecting section 136, the base station main control unit 156, and the terminal section 132. The base station group in this case leads to a form in which use is made of only the slots of the transceivers 134 in the base station 130. Furthermore it is unnecessary for the base station main control unit 56 to perform any processing pertaining to path selection.

In this configuration, data which the base station 130 has accepted from the mobile station 8 is sent through the high-frequency section 154, the transceivers 134, the internal bus 138 and the connection cable 58 to the base station 30 where the data is further fed through the internal bus 38 and the controller connecting section 36 to the base station controller 20. Data from the base station controller 20 are transmitted through the opposite path to the mobile station 8. Actions other than this in the base station system are the same as in the first embodiment and will not be further explained.

As discussed above, the interconnection of a plurality of base stations will ensure setting of even more communication channels. Also, the base station group can be easily formed by the mere addition of a simple configuration including the connection with the connection cable 58, providing a base station system having a good extensibility.

Although in the above embodiment a case has been described where a couple of base stations 30 and 130 form a single base station group, the latter may be constituted of a greater number of base stations. In this case a change-over switch is required which is switchable between the controller connecting section within one base station and at least one other base station. It is merely a matter of design to decide which base station has a switching control mechanism like the base station 130 in the above embodiment.

In the above description a plurality of base stations formed a single station group which was in turn regarded as a single base station. It is however possible to use the plurality of base stations as individual base stations by connecting the base stations 30 and 130 in series with the base station controller 20 by means of an elongate connection cable 58.

Embodiment 3

Figure 6:
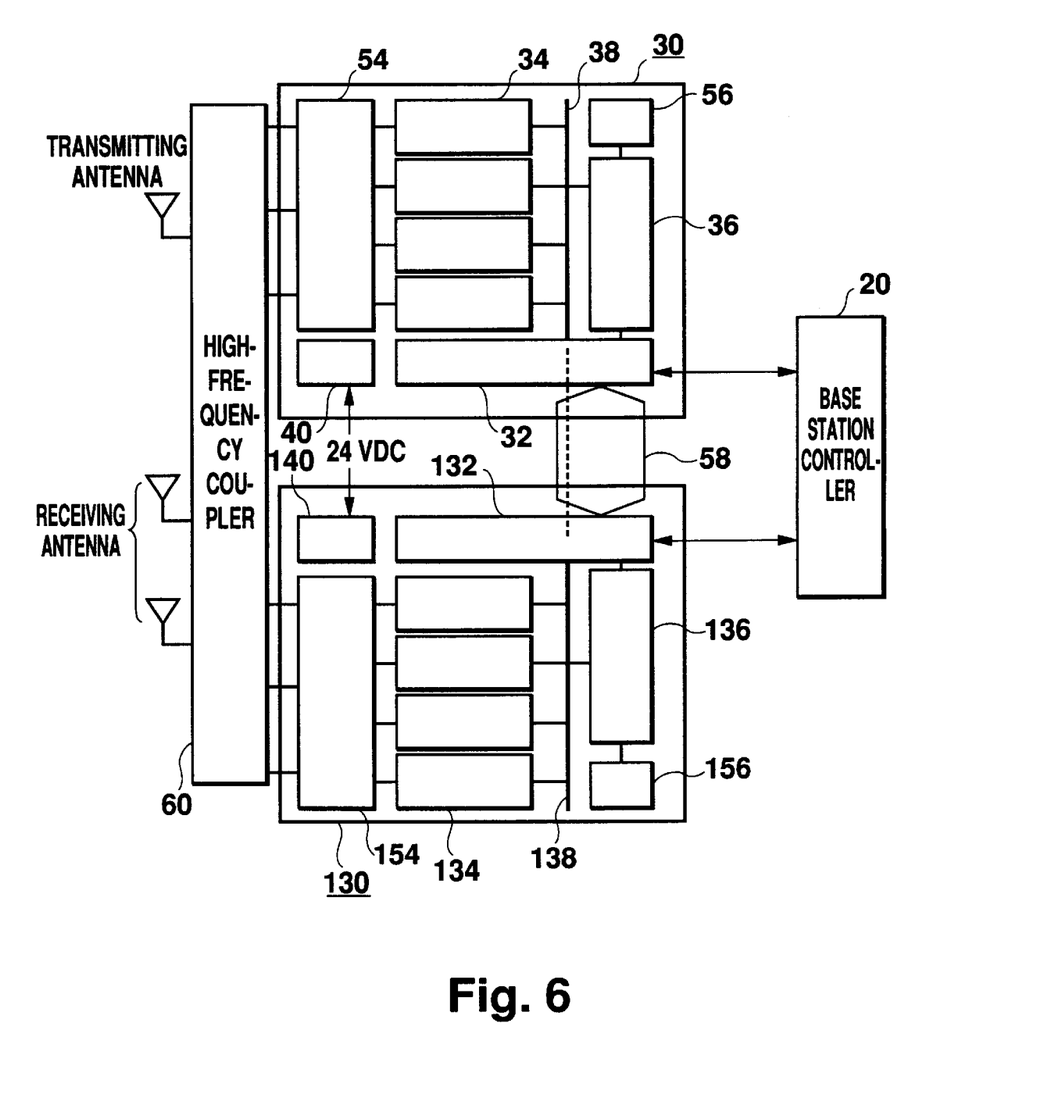
FIG. 6 is a block diagram of a base station group in a third embodiment of a base station system in accordance with the present invention.

Referring to FIG. 6 there is depicted a configuration of another embodiment of a base station group in a base station system according to the present invention. The base station group of this embodiment is characterized by the provision of a high-frequency coupler 60 serving as high-frequency coupling means for coupling together the high-frequency sections 54 and 154 respectively possessed by the base stations 30 and 130. As is apparent from FIG. 6 the base station in its entirety includes one transmitting antenna and two receiving antenna (diversity). This configuration will enable antennas possessed by the base stations 30 and 130 to be shared, resulting in a reduction in the number of antennas.

Embodiment 4

In the above embodiments, a system form suitable for a microcells has been provided by concentrating into a base station the elements for implementing the functions to be performed by the base station. This embodiment is capable of providing a base station system also suited to macrocells by forming an integral base station including a plurality of base stations appropriate for the microcell. It is to be noted that in the above embodiments the radius of a microcell was assumed to be in the order of 100 meters or less, whereas in this embodiment the radius of microcell was assumed to be in a range from several kilometers to ten (10) kilometers.

In general, base stations are arranged within a service area and a single base station forms a single cell. Although this embodiment makes direct use of the base station set forth in the above embodiments without being substantially modified, that base station is no longer to be referred to as a proper base station in terms of the concept of the above-described base station, since this integral base station uses the base station set forth in the above embodiments merely as means for executing radio communication processing. Therefore, in spite of having the same configuration, the base station set forth in the above embodiments will be referred to as a radio communication processing section which is means for executing radio communication processing. In order to avoid any confusion, the integral base station is referred to as a frame.

Figure 7:
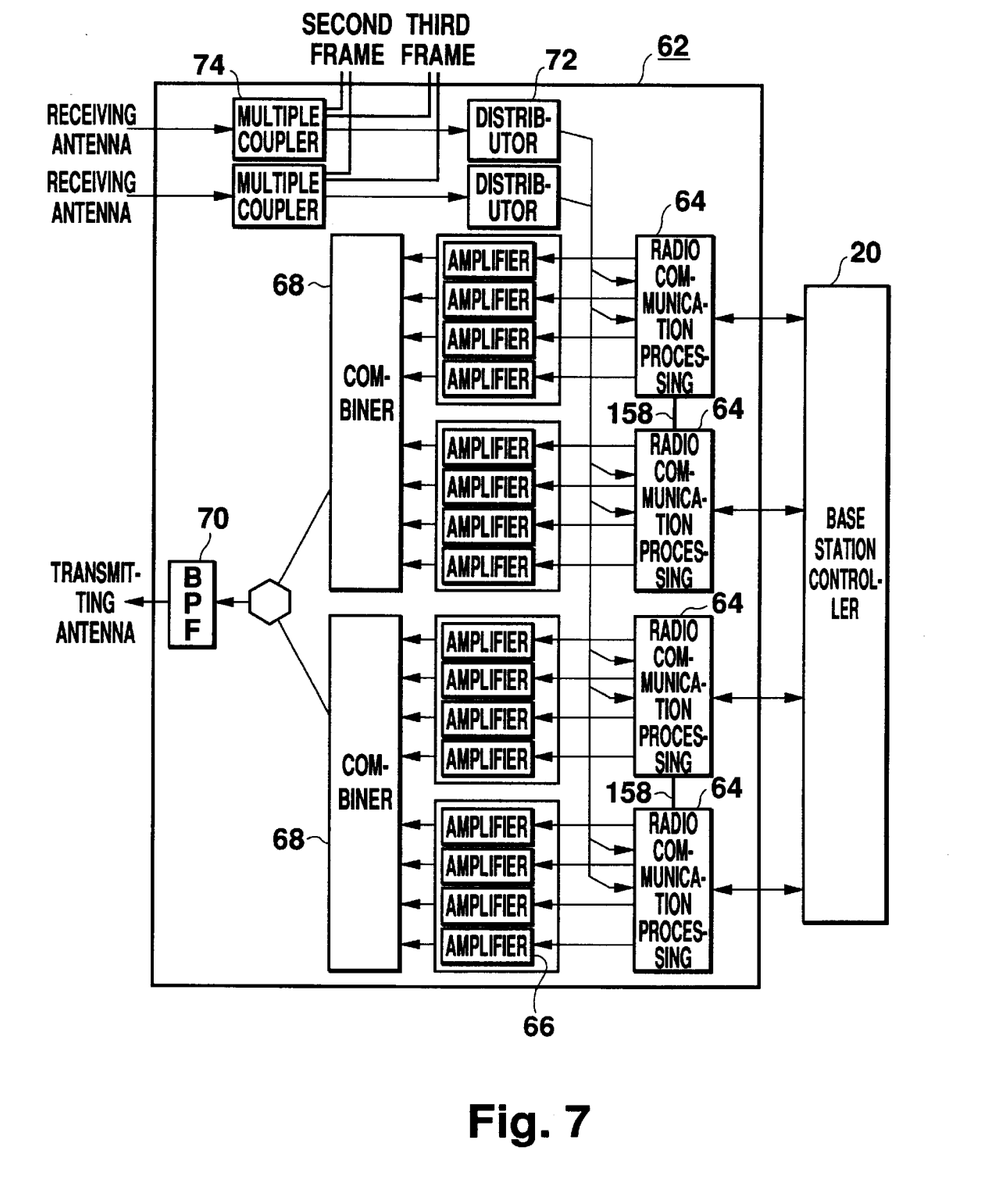
FIG. 7 is a view showing a configuration of a frame in a fourth embodiment of a base station system in accordance with the present invention.

Referring now to FIG. 7 there is depicted a configuration of a frame in this embodiment. The frame 62 comprises, as its data transmission means, power amplifiers 66 for amplifying a transmitting power for transmission information derived from the radio communication processing sections 64 acting as the radio communication processing means, combiners 68 serving as combining output means for combining and sending the transmission information, received via the amplifiers 66, from the plurality of radio communication processing sections 64, and a band pass filter (BPF) 70 for eliminating unnecessary frequency components from the output of the combiners 68 for sending to the transmitting antenna. In FIG. 7 the number of amplifiers 66 corresponds to the number of transceivers included in each radio communication processing section 64, but instead may correspond to the number of radio communication processing sections 64. Alternatively, each frame 62 may have only a single amplifier 66.

The frame 62 comprises, as its data reception means, distributors 72 that serve to distribute information received from the mobile station among the radio communication processing sections 64. As illustrated in FIG. 7 the frame 62 may comprise multiple couplers 74 acting as information distribution means that distribute the information received from the mobile station to the other frames, thereby providing a connection of the frame 62 with the other frames. In this case the other frames (second and third frames in FIG. 7) need not be mounted with the receiving antennas. Due to the employment of a diversity system, the reception means of the frame 62 has a duplex configuration of the distributors 72 and of the multiple couplers 74. The base stations in the above embodiments were all of wall-hanging type, whereas the base stations applied to the macrocell as in this embodiment are of self-supporting type mounted with power amplifiers.

Figure 8:
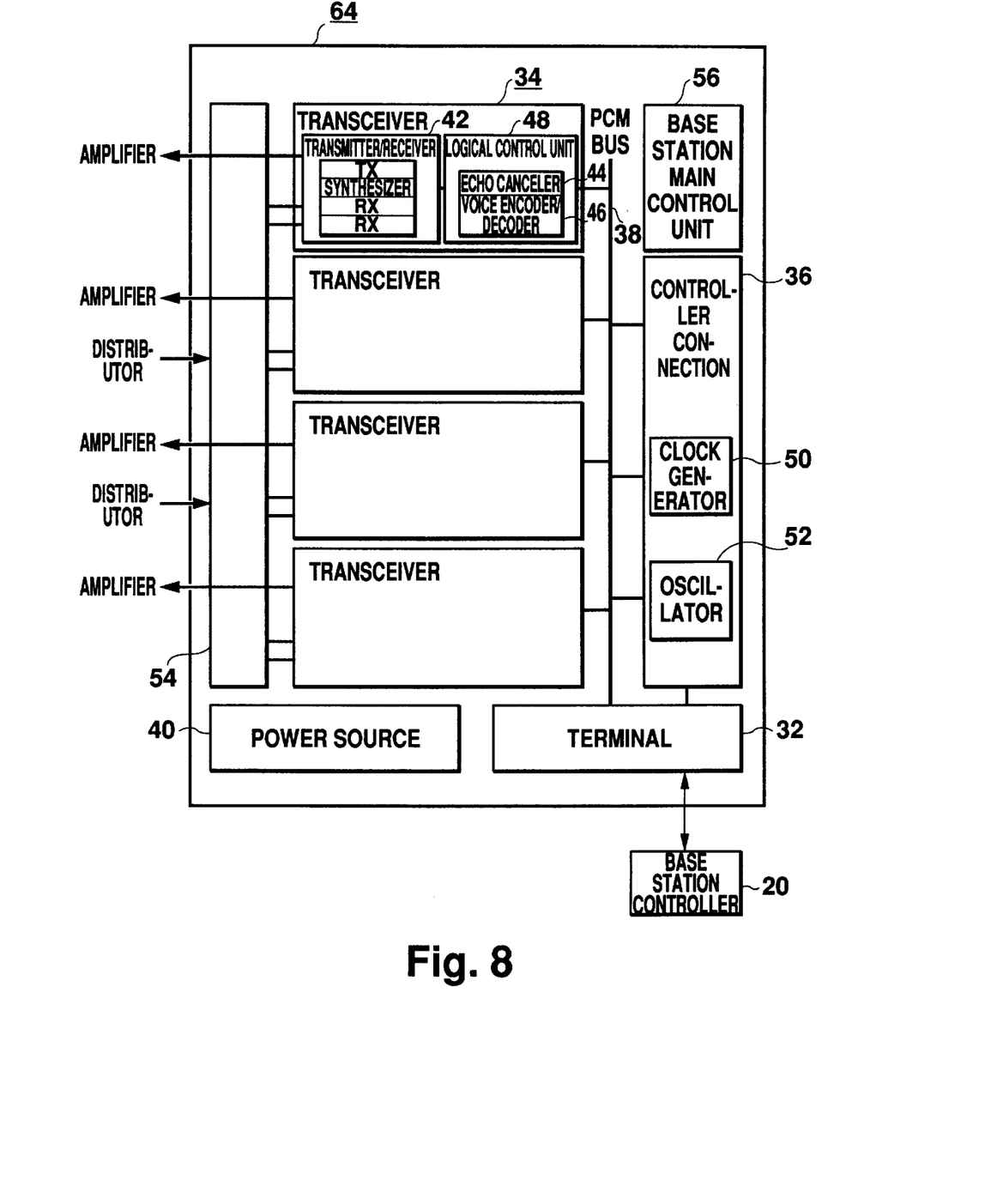
FIG. 8 is a view showing a configuration of a radio communication processing section illustrated in FIG. 7.

Referring to FIG. 8 there is depicted a configuration of the radio communication processing section 64 shown in FIG. 7. In FIG. 8 the elements identical to those of the base station illustrated in FIG. 4 are designated by the same reference numerals. The radio transmission processing section 64 has a configuration allowing transmission signals from the transceivers to be fed directly to the amplifiers. The inputs from the distributors are received by the high-frequency section 54.

Description will now be given of the action of this embodiment. The radio communication processing section 64 in the frame 62, upon receipt of information from the base station controller 20, generates transmission information. Thus the generated transmission information is amplified by the amplifiers 66 and is sent via the combiner 68 and BPF 70. The amplification of the transmission information by the amplifiers 66 will enable radio waves carrying it to be delivered over a wider range.

The distributors 72 each serve to distribute signals received by the two antennas among the four radio communication processing sections 64. Each radio communication processing section 64 further distributes the received signal among the transceivers 34. Then the radio communication processing section 64 sends the information from the mobile station which has been decoded by means of the transceivers 34 to the base station controller 20. However, provided that the information is associated with radio communication conducted between a mobile station and the frame 62, the radio communication processing section 64 is not required to send the information to the base station controller 20 unless the mobile station 8 moves out of the cell in which it is currently located.

In this manner, by employing an integral configuration having a plurality of base stations mounted therein suitable for microcells, there can be provided a base station system applicable to any macrocells.

Embodiment 5

The frame 62 in this embodiment is characterized by the provision of a connection cable 158 functioning as base station coupling means for coupling the radio communication processing sections 64 together as shown in FIG. 7. This will ensure the same effect as described in the second embodiment. The action of this embodiment results in a combination of the actions in the second and fourth embodiments, and hence will not be further explained.

Embodiment 6

The base stations in the above embodiments (including the radio communication processing sections in the fourth and fifth embodiments) have carried out communication with the mobile stations on TDMA method, but alternatively the transceivers may use an analog communication method. It is also possible for the respective transceivers 34 included in a single base station 30 to individually use either the TDMA method or the analog method. The logical control unit 48 of each transceiver 34 is so set as to be operable using either communication method and the base station main control unit 56 tends to control the individual transceivers 34 on the basis of thus the set respective communication methods. This will enable a single base station 30 to deal with different communication methods.

Although the above description has been given of a combination of the two different communication methods, that is, the TDMA method and the analog method, any combination of other communication methods such as, for example, an FDMA method and CDMA method or any combination of more than three communication methods is also possible. At the expense of reduction in size of the base station to some extent, it is also possible to configure each transceiver 34 so as to be operable with a plurality of communication methods.

Embodiment 7

The base station system conducts communication at a predetermined radio frequency, for example, 1.9 GHz. This can be implemented by incorporating a unit operable at 1.9 GHz into the transmitter/receiver section 42 of the transceiver 34 in advance. Therefore the feature of this embodiment lies in that units operable at different radio frequencies are previously incorporated into the transmitter/receiver section 43 in the base station 30 thereby allowing for communication at any arbitrary radio frequency. Thus the above configuration of this embodiment will make it possible to carry out simultaneous communication with a plurality of mobile stations using different radio frequencies. The unit can be provided for each transmitter/receiver section or for each transceiver.

Although the above description has been given of an example where a unit operable at a single radio frequency is incorporated into each transceiver 34, another unit operable at a plurality of radio frequencies may be incorporated into one transceiver at the expense of downsizing of the base station to some extent.

Embodiment 8

The base station in this embodiment has the same configuration as that of the base station 30 illustrated in FIG. 4 and is characterized by further including a testing connection section serving as testing device connecting means to connect testing mobile stations for verifying the action of the base station system. The testing connection section, not shown in FIG. 4, serves to connect the testing mobile stations by way of connectors disposed on the terminal sections 32 in the same manner as the base station controller 20. The testing mobile stations have functions equivalent to those of ordinarily used mobile stations but are connected by lines and operate under the control of the base station controller 20 or the control of the base station controller 20 and the base stations 30.

A test of the base station system will be made as follows. The base station controller 20 first transmits test data via the base station 30 to the testing mobile station. The base station controller 20 is constituted of a general purpose personal computer as stated earlier and hence is capable of easily executing a test program which has been prepared in advance. The base station controller 20 then receives data returned from the testing mobile station and compares the actually received results with expected answer results, thereby making it possible to verify the action of the base station 30 to which the testing mobile station has been connected and therefore the overall action including that of the base station controller 20.

The testing mobile station also has the same interference detection ability as that of the logical control unit 48 and is able to detect any interference upon the reception of radio waves sent out from the other base stations to which that testing mobile station has not been connected.

Thus by virtue of the provision of the testing connection section, the base station in this embodiment will allow the execution of a variety of tests.

According to the embodiments described above there can be provided a base station system suited to, for instance, a portable telephone system providing a service over a relatively restricted range such as underbuilding shopping centers. Furthermore it is possible to provide a base station system applicable also to, for instance, an automobile telephone system providing a wider range of service for outdoor use.

What is claimed is:

1. A base station system comprising:

at least one base station having a radio communication processing function and a frame decoding function for carrying out radio communication with mobile stations by receiving information from said mobile stations and processing and frame decoding said information in said at least one base station without passing said received information or decoded frame information to a base station controller, and passing said received information and decoded frame information to said base station controller in a request for telephone line control processing only when a telephone line link is necessary; and a base station controller for controlling said base station, said base station controller having a line communication processing function for performing a network communication by performing telephone line control processing based on said frame information received from said base station.

2. A base station system according to claim 1, wherein said base station includes:

at least one transceiver that performs control and management of information to be transmitted or received;

radio frequency distribution and combining means that allows radio communication of information between said transceiver and said mobile stations;

communication means that performs a communication with said base station controller;

an internal bus that connects said transceiver and said communication means; and integrative control means that perform integrative control of radio communication processing.

3. A base station system according to claim 2, further comprising:

bus coupling means for coupling said internal bus of said base station to an internal bus of another said base station to form a base station group.

4. A base station system according to claim 3, wherein said base station performs communication with said base station controller by way of said another base station.

5. A base station system according to claim 3, wherein said base station further includes switching means operable to switch paths for communication with said base station controller; and wherein said integrative control means serves to perform switching control of whether communication with said base station controller is to be performed by use of said communication means mounted thereon or by way of another base station.

6. A base station system according to claim 3 wherein said base station group includes radio frequency coupling means for coupling said radio frequency distribution and combining means possessed by said base stations.

7. A base station system according to claim 1, further comprising:

combining output means for combining and outputting transmission information from said plurality of base stations; and information distribution means for distributing information from said mobile stations among said base stations, whereby an integral base station is formed in which said plurality of base stations are mounted in the form of radio communication processing means.

8. A base station system according to claim 7, wherein said integral base station includes information distribution means serving to distribute information received from said mobile stations to another integral base station connected thereto.

9. A base station system according to claim 7, wherein said integral base station includes base station coupling means serving to couple said base stations with one another.

10. A base station system according to claim 2, further comprising:

combining output means for combining and outputting transmission information from said plurality of base stations;

information distribution means for distributing information from said mobile stations among said base stations, whereby an integral base station is formed in which said plurality of base stations are mounted in the form of radio communication processing means.

11. A base station system according to claim 10, wherein said integral base station includes information distribution means serving to distribute information received from said mobile stations to other said integral base station connected thereto.

12. A base station system according to claim 10, wherein said integral base station includes base station coupling means serving to couple said base stations with one another.

13. A base station system according to claim 1, wherein said base station uses a plurality of communication methods at the same time.

14. A base station system according to claim 2, wherein said base station allows an arbitrary setting of radio frequency used by said transceiver, thereby performing simultaneous communication with said mobile stations by use of different radio frequencies.

15. A base station system according to claim 1, wherein said base station further includes testing device connection means that connects testing mobile stations for verifying actions.

* * * * *